(12) United States Patent
Diwan et al.

(10) Patent No.: US 8,997,057 B1
(45) Date of Patent: Mar. 31, 2015

(54) USING TRACE MATCHING TO IDENTIFY AND ANALYZE APPLICATION TRACES

(75) Inventors: Amer Diwan, Mountain View, CA (US); Frederick Ryckbosch, Sint-Amandsberg (BE); Richard Lee Sites, Menlo Park, CA (US)

(73) Assignee: Google Inc., Mountain View, CA (US)

(*) Notice: Subject to any disclaimer, the term of this patent is extended or adjusted under 35 U.S.C. 154(b) by 305 days.

(21) Appl. No.: 13/463,584

(22) Filed: May 3, 2012

Related U.S. Application Data

(60) Provisional application No. 61/555,822, filed on Nov. 4, 2011.

(51) Int. Cl.
*G06F 9/44* (2006.01)

(52) U.S. Cl.
CPC ........................................ *G06F 7/344* (2013.01)
USPC ............ 717/128; 717/124; 717/127; 717/130

(58) Field of Classification Search
None
See application file for complete search history.

(56) References Cited

U.S. PATENT DOCUMENTS

| | | | | |
|---|---|---|---|---|
| 6,715,140 | B1* | 3/2004 | Haga | 717/130 |
| 7,178,134 | B2* | 2/2007 | Groeschel | 717/128 |
| 8,065,319 | B2* | 11/2011 | Ding et al. | 707/769 |
| 8,782,609 | B2* | 7/2014 | Robinson | 717/127 |
| 2003/0088853 | A1* | 5/2003 | Iida et al. | 717/128 |
| 2006/0129871 | A1* | 6/2006 | Smith | 714/2 |
| 2006/0129893 | A1* | 6/2006 | Smith | 714/38 |
| 2008/0172655 | A1* | 7/2008 | Davia | 717/130 |
| 2009/0006320 | A1* | 1/2009 | Ding et al. | 707/2 |
| 2009/0106741 | A1* | 4/2009 | Dageville et al. | 717/128 |
| 2011/0154296 | A1* | 6/2011 | Marenco | 717/128 |
| 2011/0283260 | A1* | 11/2011 | Bucuvalas | 717/124 |

OTHER PUBLICATIONS

Braberman, Victor et al., A Scenario-Matching Approach to the Description and Model Checking of Real-Time Properties, 2005, pp. 1028-1041.*
Goldsmith, Simon et al., Relational Queries Over Program Traces, 2005, pp. 385-402.*
Ducasse, Mireille, Coca: An Automated Debugger for C, 1999, pp. 504-513.*
Hayes, Jane Huffman et al., Improving Requirements Tracing Via Information Retrieval, 2003, pp. 1-10.*
Nanda, Mangala Gowri et al., Making Defect-Finding Tools Work for You, 2010, pp. 99-108.*
Safarpour, Sean et al., Managing Verification Error Traces with Bounded Model Debugging, 2010, pp. 601-606.*

* cited by examiner

*Primary Examiner* — Thuy Dao
*Assistant Examiner* — Christopher Franco
(74) *Attorney, Agent, or Firm* — Birch, Stewart, Kolasch & Birch, LLP

(57) ABSTRACT

Methods for identifying and analyzing performance traces are provided. Temporal logic formulas are patterns that can be compared with traces and individual events to identify the existence of certain behavior. Traces, sequences of time-stamped events in time order, are compared with one or more temporal logic formulas to identify the event sequences that match the formulas. The temporal logic formulas can be written in the simple temporal logic language that is presented. When a formula matches an event sequence, attributes from the event sequence are extracted and metric expressions are evaluated based on these attributes. The extracted attributes and the results of the metric expression are returned. This temporal logic pattern matching process can efficiently identify and analyze performance traces and significantly reduce manual effort for identifying performance problems.

12 Claims, 6 Drawing Sheets

US 8,997,057 B1

USING TRACE MATCHING TO IDENTIFY AND ANALYZE APPLICATION TRACES

PRIORITY STATEMENT

This application claims priority under 35 U.S.C. §119(e) to U.S. Provisional Application No. 61/555,822 filed on 4 Nov. 2011, the entire contents of which are hereby incorporated by reference into the present application.

BACKGROUND

Performance analysis is the evaluation of a computer application's behavior using information obtained as the application executes. This analysis helps identify inefficiencies in an application that may cause performance problems. To enable performance analysis, many computer applications produce trace log files to record each action, or event, that occurs as the application executes as well as the event's corresponding timestamp. Function calls, system-level kernel calls, and file system calls, are examples of application events that can be recorded in a trace log file.

Individual events and sequences of time-stamped events in time order called traces can be recorded in trace log files. One trace log file can contain hundreds of traces. Analyzing traces can be difficult and labor-intensive because there can be: (1) long chains of events in which each event affects a subsequent event; (2) events running concurrently that affect one another; and (3) complex event sequences. There is a need for a process that efficiently identifies and analyzes application traces. This process should significantly reduce manual effort, yet effectively identify performance problems.

SUMMARY

This specification describes technologies related to performance analysis in general, and specifically to an automated method for efficiently identifying and analyzing performance traces.

In general, one aspect of the subject matter described in this specification can be embodied in a computer-implemented method for processing event sequences comprising: receiving at least one temporal logic formula and at least one metric expression; comparing the temporal logic formula with an input trace to identify matching event sequences; extracting attributes from the matching event sequences which correspond to variables in the metric expression; evaluating the metric expression based on the extracted attributes; and returning extracted attributes and results of the expression. Another aspect of the subject matter described in this specification can be embodied in a computer-readable medium having stored therein computer executable code that causes one or more processors to execute the steps of: receiving at least one temporal logic formula and at least one metric function; comparing the temporal logic formula with an input trace to identify matching event sequences; extracting attributes, corresponding to variables in the metric function, from the matching event sequences; evaluating the function based on the extracted attributes; and returning extracted attributes and results of the function. An additional aspect of the subject matter described in this specification can be embodied in a system for processing event sequences, the system comprising: one or more processing devices; one or more storage devices storing instructions that, when executed by the one or more processing devices, cause the one or more processing devices to implement: a process for evaluating event sequences receiving at least one temporal logic formula and at least one metric expression; the process extracting attributes from the matching event sequences which correspond to variables in the metric expression; the process evaluating the metric expression based on the extracted attributes; and the process returning extracted attributes and results of the metric expression.

These and other embodiments can optionally include one or more of the following features: the temporal logic formula and the metric expression can be received in a trace query having the form, x:f, where x is the metric expression and f is the temporal logic formula; the temporal logic formula can be represented as a tree which corresponds to the nesting in the formula; the temporal logic formula can be written using pre-defined logical operators; and comparing the formula with the sequence of events in the input trace includes for an event in the input trace: creating a new instance of the temporal logic formula, tracking the state of the temporal logic formula instance, comparing the temporal logic formula instance with the event, and responsive to a match, storing the attributes of the event.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 5a is an exemplary tree diagram in which aspects of the present invention can be represented.

DETAILED DESCRIPTION

Computer applications follow a defined set of procedures when they execute. These procedures typically produce specific, repeatable patterns of actions which have standard, observable characteristics. For example, an electronic banking application may have a particular pattern of actions that execute when a user requests his or her account balance.

A successful user balance request may require that an application: (1) receive a request for the balance from a user; (2) get the user's account number; (3) get the user's balance; and (4) send a response with the user's balance back to the user. Therefore, a pattern to recognize a successful balance request is:

(1) ReceiveRequest for user U and id I
(2) GetAccountNumber for user U and id I
(3) GetBalance for user U and id I
(4) ResponseSent for user U and id I In this pattern, there is a sequence of steps (1-4) in which each step contains an action that is association with two attributes, a user and an id. For this pattern to successfully match a sequence of application events, the application events must occur in the same order as the steps in the pattern. The user and the id must also be the same for the events to match.

Certain patterns of application behavior can help determine what has occurred in a computer application during a particular application execution. These behavior patterns also help analyze application performance.

While an application is running, actions that happen, called events, can be recorded in a trace log file. Trace log files contain traces which are time-stamped sequences of events in time order. These trace log files can be used to understand and analyze the behavior of a computer application.

Figure 1:
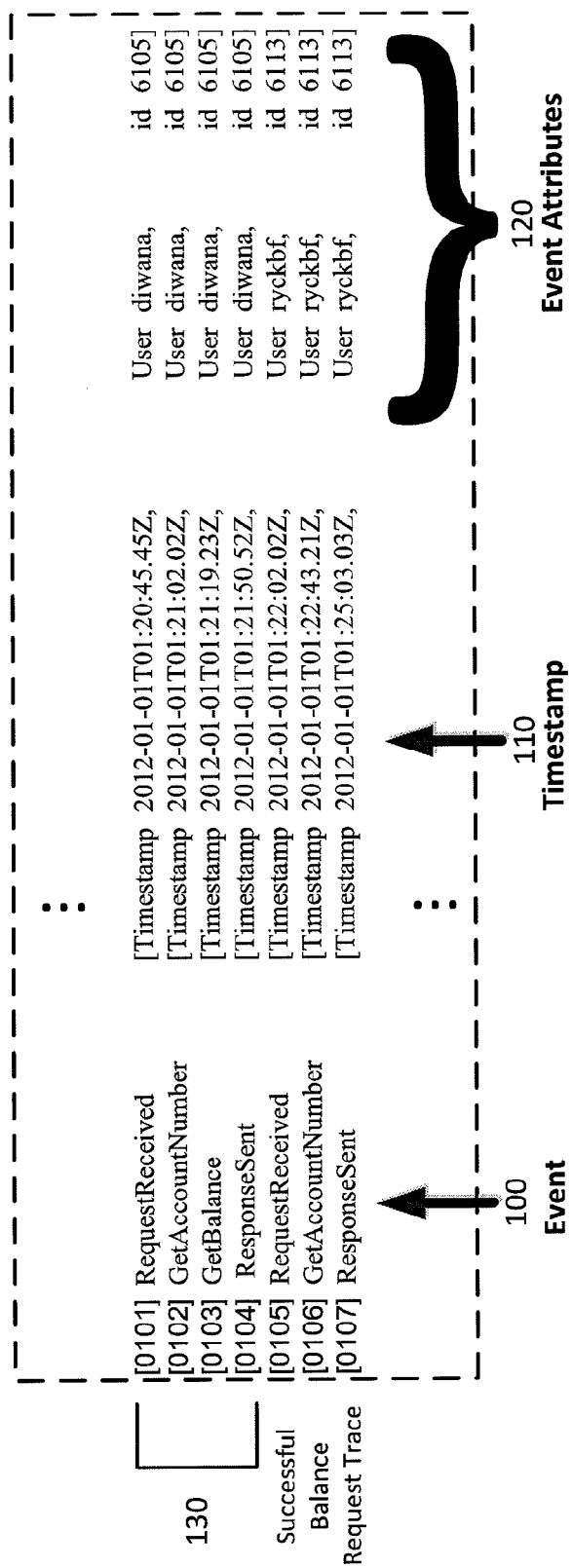
FIG. 1 is an excerpt of an exemplary trace log that can be analyzed by the present invention.

For example, the electronic banking application discussed above may write events to a trace log file when the application executes. FIG. 1 illustrates a portion of the event entries (0101 . . . 0107) from such a trace log file.

In FIG. 1, while an electronic banking application executes, each event (100) that occurs is written to the trace log file. Each event entry (0101 . . . 0107) in the trace log file has a timestamp (110) and event attributes (120) that uniquely identify the event. As noted by the timestamps (110), the events are written to the log in time order.

Using the successful balance request pattern discussed above, successful balance requests can be identified in the trace log file (130). The events associated with event entries (0101-0104) match the successful balance request pattern.

In an exemplary embodiment, patterns, in the form of temporal logic formulas, can be compared with traces and individual events.

A temporal logic formula is a pattern that can describe an application's behavior or actions qualified in terms of time. Temporal logic formulas can be written in a simple language as defined by aspects of the inventive concepts.

Events are the basic building blocks of temporal logic formulas. A formula can match single events as follows:

e: Matches any event with the name e.

$e[a_1=v_1, a_2=v_2, \ldots ]$: Matches events that have the name e and attributes $a_1$ with the value $v_1$ and $a_2$ with the value $v_2$.

For example, as discussed above, the successful balance request pattern has a sequence of steps where each step represents an action that can occur in the application. Each step matches a single event. Step 2 of the successful balance request is:

(2) GetAccountNumber for user U and id I

This step can also be written:

(2) GetAccountNumber [user=U, id=I]

In this example, GetAccountNumber is the name of the event to match. For a positive match, there must also be a match on the event's attributes. User is the first attribute. In order to match the formula, an event, GetAccountNumber, must have a user with a value of U. The second attribute is id. To positively match the formula, an event, GetAccountNumber, must also have an id with a value of I.

The (=) operator matches attribute values exactly. The exemplary language also allows for more flexibility in constraining attributes by supporting the following operators: ($\neq$) for attributes of type long or string, and ($>$), ($\geq$), ($<$), ($\leq$) for long attributes. For example, $e[a1<3]$ matches an event with name e and attribute a1 with a value less than 3. The language additionally supports a special event name "*" which matches all event names. Furthermore, formulas can be combined using AND ($\Lambda$), OR (V), and NOT (($\neg$).).

For example, a combined formula can be created to represent all of the steps required for a successful balance request in the electronic banking application discussed above.

As defined earlier, a pattern for recognizing a successful balance request can be:
(1) ReceiveRequest for user U and id I
(2) GetAccountNumber for user U and id I
(3) GetBalance for user U and id I
(4) ResponseSent for user U and id I If the pattern is qualified by time, the pattern becomes:
(1) Start with a ReceiveRequest for user U and id I AND
(2) the NEXT event for user U and id I is GetAccountNumber AND
(3) the NEXT event for user U and id I is GetBalance AND
(4) the NEXT event for user U and id I is SendResponse.

This temporal logic formula contains four steps, or sub-formulas, for matching the four events of the successful balance retrieval sequence, connected by And, and arranged by the temporal operator Next.

Temporal operators are required for comparing formulas with traces. The following temporal operators are defined for an example trace, represented by ($e_i\ e_{i+1} \ldots e_j$) that includes events, $e_i, e_{i+1}, \ldots$, and $e_j$. Event $e_i$ occurs before $e_{i+1}$, which in turn occurs before $e_{i+2}$.

Exemplary temporal operators which can be used to define the relationship between events include:

"$\circ f$" (read as Next f) which match a trace ($e_i\ e_{i+1} \ldots e_j$) iff f matches ($e_{i+1} \ldots e_j$). For example, "$\circ$GetAccountNumber" matches a trace that has a second event named "GetAccountNumber." The first event can be any event, including "GetAccountNumber";

"$\Diamond f$" (read as Eventually f) matches a trace ($e_i\ e_{i+1} \ldots e_j$) if f matches any suffix of the subtrace, ($e_{i+n} \ldots e_j$) where n is a non-negative and i+n$\leq$j. For example, "$\Diamond$ResponseSent" matches a trace that has an event with the name "ResponseSent" anywhere in the trace;

"f U g" (read as f Until g) matches a trace ($e_i \ldots e_k e_{k+1} \ldots e_j$) if the trace can be split into two parts: ($e_i \ldots e_k$) and ($e_{k+1} \ldots e_j$) such that f matches every suffix of ($e_i \ldots e_k$), but g does not match any suffix of ($e_i \ldots e_k$) and g matches ($e_{k+1} \ldots e_j$). For example, "event1 U event2" matches the trace (event1, event1, event2); and a constrained variation of $\circ$ (Next) where "$\circ[a=v]f$" matches a trace ($e_i\ e_{i+1} \ldots e_j$) if f matches the first event in the sequence $e_{i+1} \ldots e_j$ that has an attribute a with value v. This variation of $\circ$ can be expressed as: $\circ[a=v]f=\circ(\neg)$. *$[a=v]$ U f. In words, the constrained Next means that any events that do not have the matching attributes should be skipped and the first event that has the matching attributes must match f. "*" indicates that the event can have any name.

In addition to allowing temporal operators, the exemplary language permits formulas to include values that are variables. Each variable must have a single binding which is specified using "$\rightarrow$" Variables are bound when a formula positively matches an event or trace.

This temporal logic language can be used to find all the successful balance requests in the example electronic banking application.

The pattern for successful balance requests expressed in the exemplary temporal logic language is:

RequestReceived[Timestamp$\rightarrow$T1, User$\rightarrow$U, Id$\rightarrow$R] $\Lambda$
$\circ$[User=U, Id=R] (GetAccountNumber[Timestamp$\rightarrow$T2, User=U, Id=R] $\Lambda$
$\circ$[User=U, Id=R] (GetBalance[Timestamp$\rightarrow$T3, User=U, Id=R] $\Lambda$
$\circ$[User=U, Id=R] (ResponseSent[Timestamp$\rightarrow$T4, User=U, Id=R])))

In this formula, Timestamp is bound in each step to the corresponding time that each event executes. User is bound to U in the first step and then required to match U in subsequent steps. Likewise, Id is bound to R in the first step and required to match R in subsequent steps.

In the temporal logic language, the operators (¬)., ◊, and ○ have the highest precedence, followed by U, Λ, and V. Users can use parentheses to force a particular precedence.

In an exemplary embodiment, temporal logic formulas are applied to traces using trace queries, which associate temporal logic formulas (f) with a sequence of expressions $(x_1, \ldots, x_2)$ in the form: $x_1, \ldots, x_2$: f.

An expression is one or more objects such as functions, variables, constants, and operators that are evaluated to produce a value. Trace queries can contain expressions that represent metrics. These expressions can be calculated when formulas match events and traces.

For example, to calculate the total time that the electronic banking application spends on a particular successful balance request, there can be an expression for "totaltime." "Totaltime" is the time between receiving a balance request and responding to that request. Based on the temporal logic formula above, this time can be represented by "T4−T1," therefore the expression for totaltime is: "totaltime=T4−T1."

The entire trace query for calculating the total time that the electronic banking application spends on a unsuccessful balance request is:

U, R, T1, T2, T3, T4 totaltime=T4−T1:
RequestReceived[Timestamp→T1, User→U, Id→R] Λ
○[User=U, Id=R] (GetAccountNumber[Timestamp→T2, User=U, Id=R] Λ
○[User=U, Id=R] (GetBalance[Timestamp→T3, User=U, Id=R] Λ
○[User=U, Id=R] (ResponseSent[Timestamp→T4, User=U, Id=R])))

In the example, U, R, T1, T2, T3 are expression variables. U represents the user, R represents the request id, T1 is the timestamp for the event RequestReceived, T2 is the timestamp for event GetAccountNumber, T3 is the timestamp for the event GetBalance, and T3 is the timestamp for ResponseSent.

Trace queries, including at least one metric expression and at least one temporal logic formula written in the temporal logic language, can be created to extract and calculate performance metrics from a sequence of events that occurred when an application was executed.

Figure 2A:
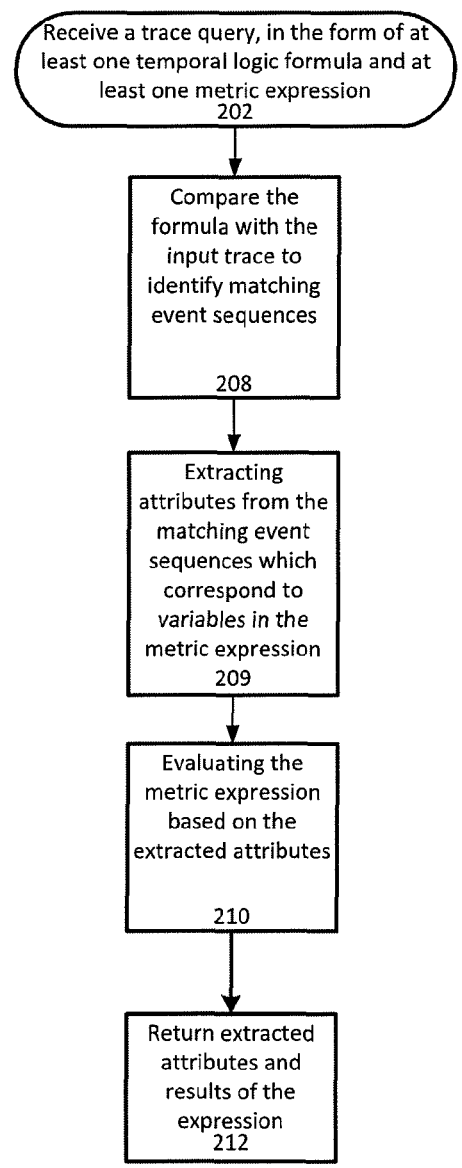
FIG. 2A is a flow diagram illustrating an example method for using trace matching to identify and analyze performance traces.

An exemplary embodiment, as illustrated in FIG. 2A, begins when a trace query is received (202). The trace query includes at least one temporal logic formula and at least one metric expression. The formula is compared with an input trace to identify matching event sequences (208). Attributes that correspond to variables in the metric expression are extracted from the matching events in the sequences (209). The metric expression is then evaluated based on the extracted attributes (210). Finally, the extracted attributes and the results of the expression are returned (212).

Figure 2B:
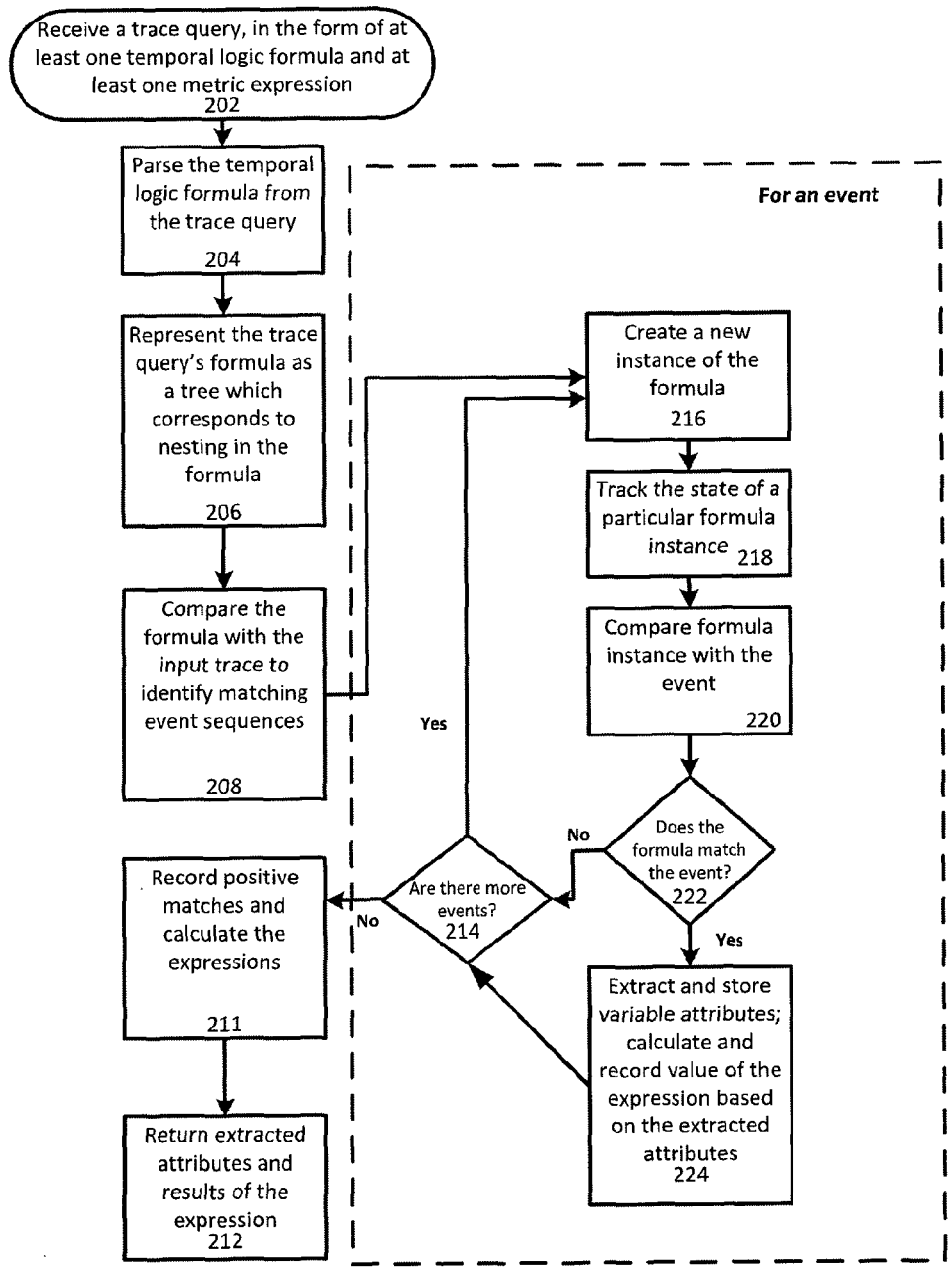
FIG. 2B is a flow diagram illustrating an example method for using trace matching to identify and analyze performance traces.

In some instances, as illustrated in FIG. 2B, an exemplary embodiment may include additional steps. A formula is parsed (204) from the trace query and can be represented as a tree which corresponds to the nesting in the formula (206).

Figure 5B:
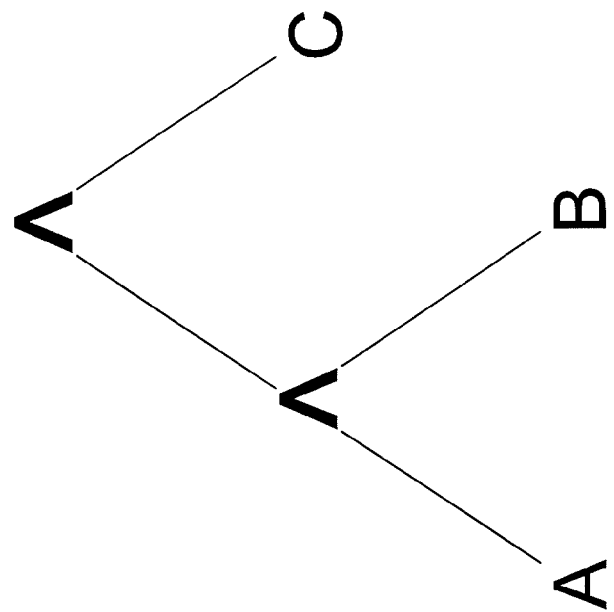
FIG. 5b is an exemplary tree diagram in which aspects of the present invention can be represented.
Figure 5B:
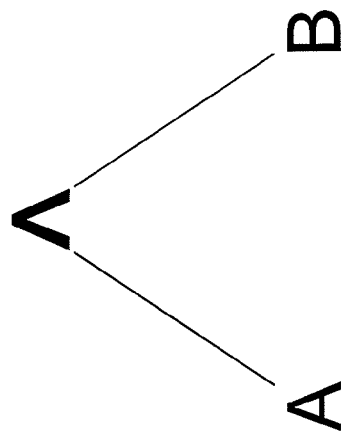

For example, as depicted in FIG. 5a, "A^B" is a tree with "^" as the root and "A" and "B" as children. If the formula is "(A^B)^C" then the tree has three levels as illustrated in FIG. 5b. "^" is the root with "^" and "C" as children. The second "^" has children "A" and "B."

The formula and an input trace can be compared to identify sequences of events in the input trace that match the formula. This comparison can be done in a single traversal of the trace. While traversing a sequence of events, a new instance of the formula is created for each event in the sequence (216). This formula instance tracks the state of the instance's match to an event and knows whether the event has matched the formula (218), as discussed below and illustrated in FIG. 3. If there is a positive match between a formula and an event, the attributes of the event are extracted and stored (224). The attributes that correspond to variables in the trace query's metric expression are extracted from the matching event and the expressions from the trace query are evaluated based on the extracted attributes (211). Then, the extracted attributes and results from the expressions are returned (212).

Figure 3:
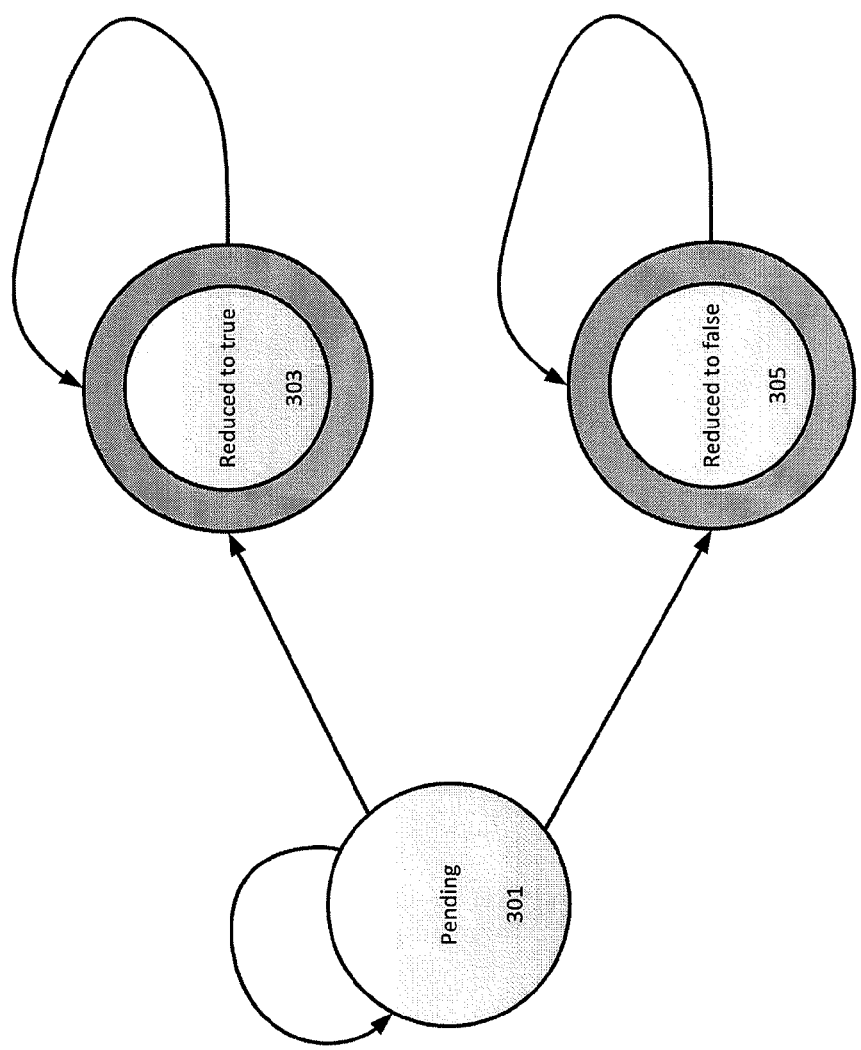
FIG. 3 is state diagram for a trace formula instance.

FIG. 3 shows the state diagram for formula instances. Formula instances can be in one of the following states: (1) pending, which means that one or more events need to be found before there is a positive match (301), (2) reduced to true, which means that there is a positive match (303), or (3) reduced to false, which means that there is not a positive match (305). All pending instances are compared with the subsequent events in the trace. Once an instance reduces to the true or false state, the instance remains in that state. Additionally, if an instance reduces to true, the instance produces an environment, based on the event's attributes, that gives details of the positive match, including binding the formula's variables.

An event formula instance, such as "event1[attr=3]" reduces to true if it positively matches the first event with which it is compared. Otherwise, the formula instance reduces to false. On reducing to true, an environment is produced that gives the values for all bound variables based on the matching event's attributes. For example, comparing the formula, "event1[attr→A]," with the event "event1[attr=3]" produces an environment that binds "A" to 3.

f Λ g is positively matched to an event that matches formulas f and g. If both formulas stay pending then the AND remains pending. If both formulas reduce to true, the AND reduces to true. If either formula reduces to false, the AND reduces to false. Otherwise, if only one formula reduces to true and the other remains pending, the AND reduces to the formula that remains pending. If the AND reduces to true, its environment contains the bindings for all the variables that f and g bind.

f V g is positively matched to an event that matches either formula f or formula g. If both formulas are pending, then the OR remains pending. If f reduces to true, OR reduces to true and produces the environment from f. Otherwise, if g reduces to true, OR reduces to true and produces the environment from g. If either formula f or formula g reduces to false, the OR reduces to the formula that is still pending.

(¬). f is positively matched to an event that does not match f. If f remains pending, then the NOT remains pending. If f reduces to false, the NOT reduces to true. If f reduces to true, the NOT reduces to false.

When comparing ○f to an event, the event is ignored on a first positive match and the formula remains pending. Subsequently, comparing ○f to an event requires positively matching on f. If f reduces to true, the Next reduces to true with f's environment. If f reduces to false, the Next reduces to false. If f remains pending, the Next remains pending.

◊ f is positively matched to an event by matching to the event. If f reduces to true, the Eventually reduces to true with f's environment. Thus, Eventually stops at the first positive match of f. If f remains pending, the Eventually remains pending.

In an exemplary embodiment, advanced queries help extract richer information from positive matches. The Eventually operator (◊) finds the first occurrence in a trace that matches its formula. Sometimes, all occurrence need to be found. For example, a process may need to start many threads as part of its work. To find the delay between the start of the process and the start of one of the threads, the following formula can be used:

Pid, Tid, delay=T2−T1:
StartProcess[Id→Pid, Timestamp→T1] ∧
◇ StartThread[Id→Pid, TaskId→Tid, Timestamp→T2]

To find the delay for all threads, the trace query can be written as follows:

Pid, ∀Tid, delay=T2−T1:
StartProcess[Id→Pid, Timestamp→T1] ∧
◇ StartThread[Id→Pid, TaskId→Tid, Timestamp→T2]

The prefix ∀ (read as "For All") is added before Tid. According to an exemplary embodiment, when a sub-formula binds the Forall variable, the current continuation is recorded. This continuation, when executed on a trace, will match the trace starting at the sub-formula that binds the Forall variable. Then the sub-formula is compared against events and the event at which the sub-formula matches is recorded and use the event to resume the continuation. This process repeats until there are no remaining matches.

In the exemplary embodiment, to match an unbounded amount of structure within a formula, "Query-Until" is used. A Query-Until gives a subquery that repeatedly matches until the Until formula matches. For example, a user request may acquire and release locks multiple times during its execution. To determine the total lock holding time across all the acquisitions, a Query-Until formula can be used. The following formula only matches requests that acquire a lock, do some work, release the lock, and send the response:

LockHoldingTime=T2−T1:
RequestReceived[Id→R] ∧
◇ (AquireLock[Timestamp→T1, Id=R] ∧
◇ (ReleaseLock[Timestamp→T2, Id=R] ∧
◇ ResponseSent[Id→R]))

Because holding time is desired, and not the time spent waiting to acquire the lock, the end time of the AcquireLock is used as the start of the lock holding time.

If a request acquires and releases a lock multiple times the above pattern will not match. To support such situations, the above formula can be written as follows:

LockHoldingTime:
RequestReceived[Id→R] ∧
({LockHoldingTime=Sum(T2−T1):
(AquireLock[Timestamp→T1, Id=R] ∧
(◇ ReleaseLock[Timestamp→T2, Id=R]))} ∧
U (∘(ResponseSent[Id=R]))

The above query has a subquery. Each instance of the subquery matches one pair of AcquireLock and ReleaseLock. Since all matches of the query will bind the same variables, an aggregation expression should be used to combine all the bindings. In the above formula, Sum is used, but other aggregations such as Max, Min, and Mean are supported. The Sum adds together all the lock holding times and thus with this query, the total lock holding time is obtained from an unbounded number of lock acquisitions and releases.

An exemplary embodiment analyzes three kinds of traces: (1) kernel traces, (2) user request logs, and (3) file system traces. However, aspects of the inventive concepts can be applied to any types of event sequences in time order.

There are also various implementation techniques which can be used to achieve an efficient implementation.

A formula may use a constrained Next, . . . ∘[A=a] . . . , where the elided part of the formula (denoted by . . . ) binds "a." If the trace to be matched includes numerous interleaved matches of the above formula, many instances of this formula will be produced and all the active instances need to be checked against each event in the trace.

To avoid the cost of checking against each event in the trace, a map is maintained that maps attribute values to the formula instances that are waiting for those values. One map is maintained for each sequence of attributes that is encountered in the formulas. For example, given the following formula:

$$\ldots \circ[A=a] \ldots \circ[A=x, B=y] \ldots$$

There would be two maps, one for the attribute "A" and one for the pair of attributes "(A,B)." When an event is encountered, the event's attributes are examined and all maps that may be relevant to the event are found. If the event is E[Timestamp=1, A=10, B=20], both the "A" and the "(A, B)" maps are relevant. The attribute values in the event are used to look up the maps and find the formula instances that are possibly waiting on the event.

A similar approach may be used to optimize other operators such as Eventually. Formulas using Eventually may be arbitrarily complex. A formula should be analyzed to determine the attributes on which the formula is waiting. An exemplary embodiment defines the function W which when applied to a temporal formula produces a set that gives the attribute values on which the formula is waiting.

$$W \circ [A_1 = v_1, A_2 = v_2 \ldots] \rightarrow \{(A_1 = v_1), (A_2 = v_2) \ldots\}$$

The constrained Next is waiting on the next event with the matching attribute values.

$$W \diamond f \rightarrow Wf.$$

The Eventually is waiting that which f is waiting.

$$Wf \wedge g \rightarrow WfUWg$$

The AND is waiting on any variable on which either f or g is waiting.

$$WfVg \rightarrow WfUWg$$

The OR is waiting on any variable on which either f or g is waiting.

$$W(\neg).f \rightarrow \text{All}$$

The NOT is waiting for everything (All is the universal set).

$$WE[A_1 = v_1] \rightarrow \{(\text{EventName} = E), (A_1 = v_1), \ldots\}$$

An event formula is waiting for events with a matching name and attributes. For convenience, the event name is treated as an attribute.

This optimization is used only when the top-level formula uses Eventually or the constrained Next. For other formulas (such as formulas that simply match an event), waiting is not necessary.

Although the above optimization does not help with Not, some uses of Not are common and optimizations can be made. Specifically, formulas often use the following construction to make sure that the last occurrence of f is seen: ◇ (¬). f. In the process previously described, all of these formula instances would be matched to all events. However, this formula only needs to know if f becomes true. Thus, W ◇ (¬). f→Wf.

There is also an optimization for the operator Until. A common pattern using U is (¬). f U g. This pattern finds a match for g before formula f matches. The execution of this formula is optimized by creating a waiting state for both f and g. If f is found before g, the formula is not satisfied. If f is not found before g, the formula is satisfied. Using this technique, (¬). f does not have to be checked for each event.

The provisional application incorporated by reference into this document contains additional examples of aspects of the inventive concepts including more uses of temporal logic formulas to define and analyze traces. A C++ mutex implementation can use a queue to hold all threads waiting on the mutex. If a thread needs to block on a mutex, it must put itself on the mutex's "waiting" queue; a spin-lock guards access to this queue. If the thread cannot get the spin lock after a few iterations of spinning, it goes to sleep for k nanoseconds using a call to nanosleep; on wakeup it tries again to acquire the spin lock. This problem gets worse if the thread holding the mutex cannot access the waiting queue to find which threads to wake up when releasing the mutex. This situation is so bad that the mutex implementers expect it to never happen. Thus, they did not add instrumentation to count occurrences. Fortunately, given a kernel trace for a thread, the situation can be expressed as follows:

1. The thread is executing in user space and next
2. The thread calls nanosleep and next
3. The kernel preempts the thread and gives the CPU to another thread (i.e., context switch) and then next
4. The kernel gives the CPU back to the original thread (another context switch) and next
5. The thread finishes executing nano sleep (it wakes up) and next
6. The thread continues executing in user space and next
7. The thread makes a system call to futex to release the lock and next
8. The thread calls sched_wakeup to wake up the waiting threads.

In general kernel traces often contain interleaved events for numerous threads. A constrained next is used to easily handle this generalization.

The following can be the formula expressed in the exemplary temporal logic language:
UserMode[thread_id→t] ∧
○[thread_id=t](syscall[name="nanosleep"] ∧
  ○[thread_id=t] (preempt ∧
  ○[thread_id=t] (resume ∧
    ○[thread_id=t] (syscall[name="nanosleep"] ∧
      ○[thread_id=t] (UserMode ∧
        ○[thread_id=t] (syscall[name="futex"] ∧
          [thread_id=t] sched_wakeup))))))

This formula uses a variable (t) to hold the thread id for a thread and the constrained next which skips over events for other unrelated threads in search for the next event for thread t.

A formula may also be written to calculate the type, size, and duration of file system operations:
Duration=T2−T1, Op, Bytes:
fs_enter[Timestamp→T1, op→Op, pid→Pid] ∧
◇ fs_exit[Timestamp→T2, ret→Bytes, pid=Pid]
  fs_enter marks a file system request and fs_exit marks the end of a file system request. Since the enter and exit must be in the same process, this formula uses the process id (Pid) to associate the fs_exit with its fs_enter. The return value of the fs_exit gives the number of written bytes.

The second formula calculates the total lock holding time for an email request. The formula is developed in steps. First, a formula is written that matches a user request with its response. The email server may assign a dedicated thread process to the entirety of each user request. Thus, the thread can be used to link the request and the response:

Request[thread→Tid]∧ ◇ Response[thread=Tid]

A formula can be developed for holding time, where holding time is the total time for which a given request holds a lock.
HoldingTime=T2−T1:
AcquiredLock[thread→Tid, Timestamp→T1, lock→L] ∧
◇ ReleasedLock[thread=Tid, Timestamp→T2, lock=L]

To calculate the total holding time for a request, the two formulas should be combined. The main subtlety in combining the formulas is that a request may acquire and release locks many times and not just once. Therefore, a Query-Until construct should be used.
HoldingTime=T2−T1:
Request[thread→Tid] ∧ ◇ Response[thread=Tid] ∧
{HoldingTime=Sum(T2−T1):
AcquiredLock[thread=Tid, Timestamp→T1, lock→L] ∧
◇ ReleasedLock[thread=Tid, Timestamp→T2, lock=L]} U
(◇ Response[thread=Tid])

The thread id ties together all the events and the query-until to calculate and accumulate the holding time across all the times the request holds the lock.

A third pattern calculates the duration between a remote procedure call (RPC) request arriving on a socket and the end of the RPC. The RPC mechanism works as follows: (a) the epoll_wait detects that some data has arrived for one or more RPCs; (b) recvfrom reads the data; (c) start_rpc marks the starting of RPC processing by the application; (d) sendto sends the response to the RPC; and (e) end_rpc marks the end of the RPC in user space. While existing tools can measure and quantify the duration between start_rpc and end_rpc, this duration ignores many of the costs of the RPC, namely the time between the epoll_wait and the start_rpc. Actual duration is difficult to measure because at the time of recvfrom, it is not known which RPC is being processed. The identity of the RPC is only known once the data is received. Thus, the following pattern is valuable for understanding delays in RPCs.

syscall[name="recvfrom", arg1→Sid] ∧
(○((¬). syscall[name="recvfrom", arg1=Sid] U
(start_rpc[RpcI→Rid] ∧
  ◇ syscall[name="sendto", RpcId=Rid, arg1=Sid])))

The formula can be extended to include the epoll_wait by being speculative. Assuming that the latest epoll_wait before the recvfrom is the one that notices that data has arrived for the RPC, the formula may underestimate "Actual Time" because the latest epoll_wait may not be the correct epoll_wait for this RPC.
syscall[name="epoll_wait", ret>0, Timestamp→T1] ∧
(○((¬). syscall[name="epoll_wait", ret>0] U
(syscall[name="recvfrom", arg1→Sid] ∧
(○((¬). syscall[name="recvfrom", arg1=Sid] U
(start_rpc[RpcId→Rid, Timestamp→T3] ∧
  ◇ syscall[name="sendto", RpcId=Rid, arg1=Sid])))))

The epoll_wait returns a value greater than zero if it finds data waiting on a socket. Thus, the formula looks specifically for such an epoll_wait. Also, for RPCs with large arguments, there may be multiple calls to recvfrom.

Using the environment for a match of this formula, an under-approximation to "Total Time" can be calculated. A given epoll_wait call may notice that there is data not just on one socket, but on many sockets. Therefore, the epoll_wait may be part of the match for many different RPCs. To represent this scenario, a forall can be used.
∀Sid, Rid, Sid, PreRpcLatency=T3−T1:
. . . .

Figure 4:
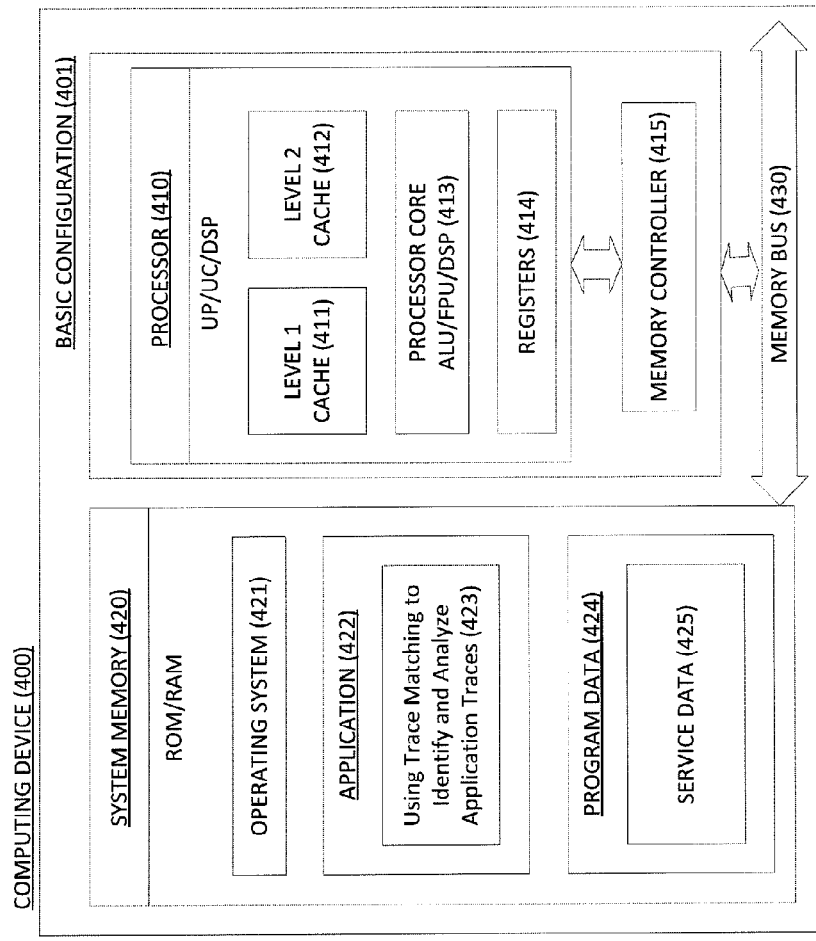
FIG. 4 is a block diagram illustrating an example computing device that may be used to implement various aspects of the invention.

FIG. 4 is a block diagram illustrating an example computing device (400) that is arranged for identifying and analyzing performance traces. In a very basic configuration (401), the computing device (400) typically includes one or more processors (410) and system memory (420). A memory bus (430) can be used for communicating between the processor (410) and the system memory (420).

Depending on the desired configuration, the processor (410) can be of any type including but not limited to a microprocessor (µ,P), a microcontroller (µC), a digital signal processor (DSP), or any combination thereof. The processor (410) can include one more levels of caching, such as a level one cache (411) and a level two cache (412), a processor core (413), and registers (414). The processor core (413) can include an arithmetic logic unit (ALU), a floating point unit (FPU), a digital signal processing core (DSP Core), or any combination thereof. A memory controller (415) can also be used with the processor (410), or in some implementations the memory controller (415) can be an internal part of the processor (410).

Depending on the desired configuration, the system memory (420) can be of any type including but not limited to volatile memory (such as RAM), non-volatile memory (such as ROM, flash memory, etc.) or any combination thereof. System memory (420) typically includes an operating system (421), one or more applications (422), and program data (424). The application (422) includes an application that can identify and analyze performance traces using trace matching. Program Data (424) includes storing the instantiated formulas and variable attributes in order to accurately compute metric expressions across multiple events. In some embodiments, the application (422) can be arranged to operate with program data (424) on an operating system (421).

The computing device (400) can have additional features or functionality, and additional interfaces to facilitate communications between the basic configuration (401) and any required devices and interfaces. For example, a bus/interface controller (440) can be used to facilitate communications between the basic configuration (401) and one or more data storage devices (450) via a storage interface bus (441). The data storage devices (450) can be removable storage devices (451), non-removable storage devices (452), or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory (420), removable storage (451), and non-removable storage (452) are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of the device (400).

The computing device (400) can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device (400) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for processing event sequences comprising:
   receiving at least one temporal logic formula and at least one metric expression, wherein the temporal logic formula defines a pattern of events that describes an application's behavior or actions qualified in terms of time and the metric expression defines a measurement to analyze the application based on the temporal logic formula's pattern of events;
   representing the temporal logic formula as a tree which corresponds to the nesting in the formula;
   comparing the temporal logic formula with an input trace to identify matching event sequences;
   extracting attributes from the matching event sequences which correspond to variables in the metric expression;
   evaluating the metric expression based on the extracted attributes; and
   returning extracted attributes and results of the expression.

2. The computer-implemented method of claim 1, wherein the temporal logic formula and metric expression are received in a trace query having the form, x:f, where x is the metric expression and f is the temporal logic formula.

3. The computer-implemented method of claim 1, wherein comparing the formula with the sequence of events in the input trace includes for an event in the input trace:
- creating a new instance of the temporal logic formula;
- tracking the state of the temporal logic formula instance;
- comparing the temporal logic formula instance with the event; and
- responsive to a match, storing the attributes of the event.

4. The computer-implemented method of claim 1, wherein the temporal logic formula is written using pre-defined logical operators.

5. A non-transitory computer-readable medium having stored therein computer executable code that causes one or more processors to execute the steps of:
- receiving at least one temporal logic formula and at least one metric function, wherein the temporal logic formula defines a pattern of events that describes an application's behavior or actions qualified in terms of time and the metric expression defines a measurement to analyze the application based on the temporal logic formula's pattern of events;
  - representing the temporal logic formula as a tree which corresponds to the nesting in the formula;
- comparing the temporal logic formula with an input trace to identify matching event sequences;
- extracting attributes, corresponding to variables in the metric function, from the matching event sequences;
- evaluating the function based on the extracted attributes; and
- returning extracted attributes and results of the function.

6. The non-transitory computer-readable medium of claim 5, wherein the temporal logic formula and metric function are received in a query having the form, x:f, where x is the metric function and f is the temporal logic formula.

7. The non-transitory computer-readable medium of claim 5, wherein comparing the formula against the sequence of events in the input trace includes for each event in the input trace:
- creating a new instance of the temporal logic formula;
- tracking the state of the new temporal logic formula instance;
- comparing the instantiated temporal logic formula with the event; and
- responsive to a match, storing the attributes of the event.

8. The non-transitory computer-readable medium of claim 5, wherein the temporal logic formula is written using pre-defined logical operators.

9. A system for processing event sequences, the system comprising:
- one or more processing devices;
- one or more storage devices storing instructions that, when executed by the one or more processing devices, cause the one or more processing devices to implement:
  - a process for evaluating event sequences receiving at least one temporal logic formula and at least one metric expression, wherein the temporal logic formula defines a pattern of events that describes an application's behavior or actions qualified in terms of time and the metric expression defines a measurement to analyze the application based on the temporal logic formula's pattern of events;
  - the process representing the temporal logic formula as a tree which corresponds to the nesting in the formula;
  - the process comparing the temporal logic formula with an input trace to identify matching event sequences;
  - the process extracting attributes from the matching event sequences which correspond to variables in the metric expression;
  - the process evaluating the metric expression based on the extracted attributes; and
  - the process returning extracted attributes and results of the metric expression.

10. The system of claim 9, wherein the temporal logic formula and metric expression are received in a trace query having the form, x:f, where x is the metric expression and f is the temporal logic formula.

11. The system of claim 9, wherein comparing the formula with the sequence of events in the input trace includes for an event in the input trace:
- creating a new instance of the temporal logic formula;
- tracking the state of the temporal logic formula instance;
- comparing the temporal logic formula instance with the event; and
- responsive to a match, storing the attributes of the event.

12. The system of claim 9, wherein the temporal logic formula is written using pre-defined logical operators.

* * * * *